US011210731B1

(12) United States Patent
Croak et al.

(10) Patent No.: US 11,210,731 B1
(45) Date of Patent: Dec. 28, 2021

(54) SYSTEMS AND METHODS TO ANALYZE PRODUCT PRICING

(71) Applicant: UIPCO, LLC, San Antonio, TX (US)

(72) Inventors: Michelle Susan Croak, Chicago, IL (US); Stephen Joseph Contreras, Dallas, TX (US); Jo Anne Yau, San Antonio, TX (US); Charise Renee Whitaker, San Antonio, TX (US); Jason Algernon Webster, San Antonio, TX (US); Salvador J. Rodriguez, Boerne, TX (US); Jon D. McEachron, Boerne, TX (US); Kimberly Wiessner, San Antonio, TX (US); Oscar Guerra, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 29 days.

(21) Appl. No.: 16/719,405

(22) Filed: Dec. 18, 2019

Related U.S. Application Data

(60) Provisional application No. 62/781,489, filed on Dec. 18, 2018.

(51) Int. Cl.
*G06Q 30/06* (2012.01)
*G06K 7/10* (2006.01)
*G06Q 20/20* (2012.01)

(52) U.S. Cl.
CPC ..... *G06Q 30/0643* (2013.01); *G06K 7/10386* (2013.01); *G06Q 20/208* (2013.01);
(Continued)

(58) Field of Classification Search
CPC .......... G06Q 30/0601; G06Q 30/0643; G06Q 30/0633; G06Q 30/0629; G06Q 20/208; G06K 7/10386
(Continued)

(56) References Cited

U.S. PATENT DOCUMENTS

2007/0288497 A1* 12/2007 Droznin ............... G09B 29/007
2009/0037283 A1*  2/2009 Anderson ............ G06Q 10/087
705/15
(Continued)

FOREIGN PATENT DOCUMENTS

KR         101260402 B1 *  5/2013  ............. G06Q 30/02

OTHER PUBLICATIONS

Chaure, Bhasha; Jain, Preet. 2016 International Conference on Emerging Technological Trends (ICETT). 2016 Proceedings: 5 .; 591. IEEE. (2016).*

*Primary Examiner* — Yogesh C Garg
(74) *Attorney, Agent, or Firm* — Perkins Coie LLP

(57) ABSTRACT

The described systems and methods provide a user's mobile device with a graphical user interface that can provide information about the lowest price offered for one or more products. For instance, when a person at a physical retail store places one or more products in a physical shopping cart, a scanning device may scan the one or more products to obtain information about the one or more products, the scanned information is sent to a server that provides pricing and store location information to a mobile device based on the scanned information, the pricing and store location information can be analyzed by the mobile device to display the lowest price and store location for each product.

18 Claims, 11 Drawing Sheets

(52) U.S. Cl.
CPC ..... *G06Q 30/0601* (2013.01); *G06Q 30/0629* (2013.01); *G06Q 30/0633* (2013.01)

(58) Field of Classification Search
USPC ........................... 705/26.1, 27.1, 26.64, 26.8
See application file for complete search history.

(56) References Cited

U.S. PATENT DOCUMENTS

| | | | |
|---|---|---|---|
| 2012/0296759 A1* | 11/2012 | Shechtman | G06Q 30/08 705/26.3 |
| 2014/0006195 A1* | 1/2014 | Wilson | G06Q 20/3274 705/21 |
| 2014/0214596 A1* | 7/2014 | Acker, Jr. | G06Q 20/20 705/26.8 |
| 2017/0316400 A1* | 11/2017 | Venkatakrishnan | G06Q 20/3674 |
| 2018/0211074 A1* | 7/2018 | Jones | G06F 16/90335 |
| 2019/0236583 A1* | 8/2019 | Hagen | G06Q 20/3224 |
| 2020/0000248 A1* | 1/2020 | Jain | G06K 7/1417 |

* cited by examiner

SYSTEMS AND METHODS TO ANALYZE PRODUCT PRICING

CROSS-REFERENCE TO RELATED APPLICATIONS

This application is a non-provisional of and claims priority to U.S. Provisional Application No. 62/781,489, filed on Dec. 18, 2018, entitled "SYSTEMS AND METHODS TO ANALYZE PRODUCT PRICING," which is hereby incorporated by reference in its entirety for all purposes.

BACKGROUND

A person shopping at a physical retail store cannot as easily compare prices to save money as that person can with shopping on the Internet. For instance, a person shopping on the Internet can easily compare prices offered by at least two online sellers to purchase a product from a seller offering the product for the lowest price. However, when a person is shopping at a physical retail store or is about to shop for a product at a physical retail store, the person does not readily have price comparison information. Often, the person may stop shopping and search for the product online to compare the price offered by an online seller to the price offered by the retail store. This search process may include searching for the product with a single online seller who, along with the retail store, may not offer the lowest price for the product. Furthermore, the person may have to perform this tedious process for each product for which the person would like a price comparison. However, such a conventional system does not easily provide a consumer with information to allow the consumer to purchase products at the best prices.

Figure 1A:
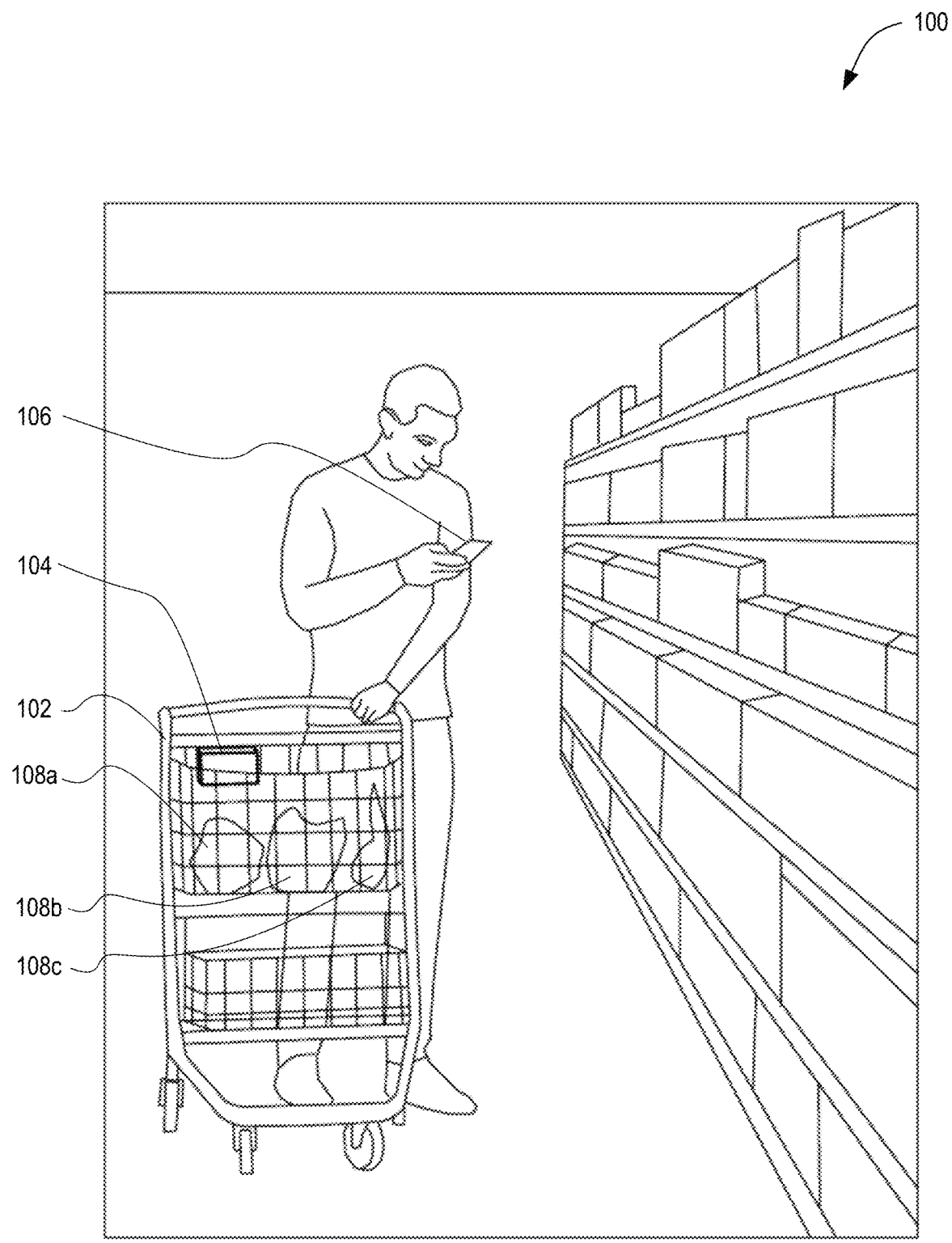
FIG. 1A shows an example scenario of a person obtaining price comparison information for the products placed in a shopping cart while the person is shopping at a physical retail store.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Prior to this technology, a person shopping for a product at a physical retail store compares prices for that product using a familiar process. A person may use his or her mobile device to search an online seller's website for that product. Next, the person determines whether the physical retail store or the online seller offers the lowest price for that product. In some cases, the person may search multiple websites associated with other physical retail stores or online sellers to determine a lowest price for a product. And, in some cases, the person may perform this process to compare prices for each product that the person wants to purchase. This process is cumbersome and may not provide the person with the lowest price for the product. This is because the person may obtain a price for a product by searching a website from a seller ABC, Inc., which may be lower than the price for the product offered by the physical retail store where the person is located, but the lowest price for the product may be offered by another online seller XYZ, Inc that was not searched by the person. As used in this patent document, the term "product" can include goods (e.g., laptop, breakfast cereal, etc.,) or services (e.g., renting a lawnmower, renting a truck, etc.).

The embodiments described in this disclosure describe systems and methods to provide a graphical user interface on a mobile device that can provide information about the lowest price offered for one or more products. For instance, when a person at a physical retail store places one or more products in a physical shopping cart, a scanning device may scan the one or more products to obtain information about the one or more products, the scanned information is then sent to a server that provides pricing and store location information to a mobile device based on the scanned information, and the pricing and store location information can be analyzed by the mobile device to display the lowest price and store location for each product.

The embodiments describe techniques to perform certain operations passively or automatically without requiring a person to take many steps to request a price comparison for the product(s) that the person wants to purchase. In some embodiments, the scanning operation, the providing of the pricing and store information operation, and the analyzing of the pricing and store information operation may be performed on product(s) place in a physical shopping cart without requiring any request from the person to perform price comparison. For instance, the scanning operation (and subsequent operations) may be triggered when a physical shopping cart detects that a product is placed or is about to be placed in the physical shopping cart. Thus, the exemplary embodiment improves current technology at least because the process to obtain information about the product(s) located in a physical shopping cart and the process to analyze the information associated with the product(s) may be done passively, i.e., without requiring much input from a person.

In this disclosure, example headings for the various sections below are used to facilitate the understanding of the disclosed subject matter and do not limit the scope of the claimed subject matter in any way. Accordingly, one or more features of one example section can be combined with one or more features of another example section. Section I describes embodiments for the price comparison feature that may be performed while a person is shopping at a physical retail store. Section II describes a price matching policy feature that allows a mobile device to display information indicative of whether a store where the user is currently shopping has a price matching policy. Section III describes a budgeting feature that allows a user to be informed of purchases that may affect the user's budget. Section IV describes a total cost feature that allows a mobile device to display a total cost of the products that the user may want to purchase. The mobile device may display a total cost for each seller that offers the products that the user wants to purchase. Section V describes a price comparison feature that the user may initiate before entering a physical retail store or performing an online search at an online seller's website. Section VI describes historical prices feature that allows a mobile device to display prices obtained by the remote server over a certain time period (e.g., six months or one year).

I. Price Comparison Feature—Shopping at a Physical Retail Store

FIG. 1A shows an example scenario of a person obtaining price comparison information for the products placed in a shopping cart while the person is shopping at a physical retail store 100. The shopping cart 102 is located in the physical retail store and may include a scanner device 104 that can scan one or more products 108a, 108b, and 108c placed in the shopping cart. As a result of the scan, the scanner device 104 obtains an identifier associated with each product. The scanner device 104 may include, for example, an optical reader, a radio frequency identification (RFID) reader, a near-field communication (NFC) device, or a camera. In an example implementation, the scanner device 104 may use its optical reader to scan the quick response (QR) code, a universal product code (UPC) barcode printed on each product in the shopping cart 102. In another example implementation, the scanner device 104 may use its NFC device to wirelessly scan NFC tags located on each product.

In some embodiments, the scanner device 104 may include a wireless device, e.g., a cellular or Wi-Fi transceiver, so that the scanner device 104 may send the one or more identifiers to the remote server using wireless communications. In some other embodiments, the scanner device 104 may wirelessly send the one or more identifiers to the remote server via the mobile device 106. For example, the scanner device 104 may send the one or more identifiers to the mobile device 106 using a Wi-Fi or Bluetooth signal, and the mobile device 106 may send the received one or more identifiers to a remote server using a cellular signal.

Figure 1B:
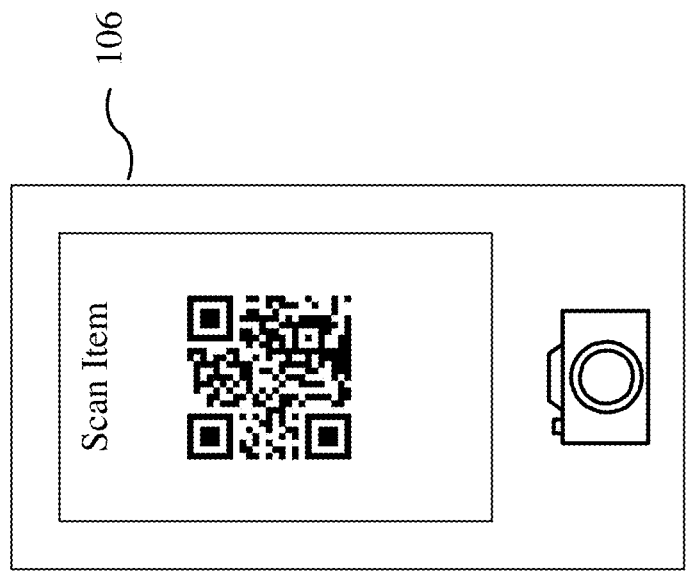
FIG. 1B shows a mobile device using its camera to scan a quick response (QR) code of a product.

In some embodiments, the scanner device 104 may be located in the mobile device 106. In an example implementation, as shown in FIG. 1B, a mobile device 106 may use its camera to scan a quick response (QR) code of one or more product that the user wants to purchase. In such embodiments, the mobile device 106 may scan the one or more products 108a-108c placed in the shopping cart 102 to obtain an identifier associated with each product. Next, the mobile device 106 may send the one or more identifiers for the one or more products 108a-108c to the remote server using a wireless signal (e.g., a cellular signal).

Returning to FIG. 1A, in embodiments where the scanner device 104 is included in or as part of the shopping cart 102, the shopping cart 102 can be considered a "smart" shopping cart at least because it can automatically perform a scanning operation on the one or more products 108a-108c placed in the shopping cart 102. For instance, the shopping cart 102 may perform the scanning operation when it detects that a product is placed or is about to be placed in the shopping cart 102. In an example implementation, the shopping cart 102 may include a weight sensor so that when a product is placed in the shopping cart 102, the weight sensor sends a signal to the scanner device 104 to perform a scan of the product placed in the shopping cart 102. In another example implementation, the shopping cart 102 includes a proximity sensor so that when a product is placed or is about to be placed in the shopping cart 102 the proximity sensor sends a signal to the scanner device 104 to perform a scan of the product placed in the shopping cart 102. In some embodiments, the scanner device can determine a weight of at least one product, where prices obtained for the product from various stores (as further explained in this disclosure) is based on the weight of the at least one product. In such embodiments, the weight information may be sent by the scanner device 104 to the remote server.

Figure 2:
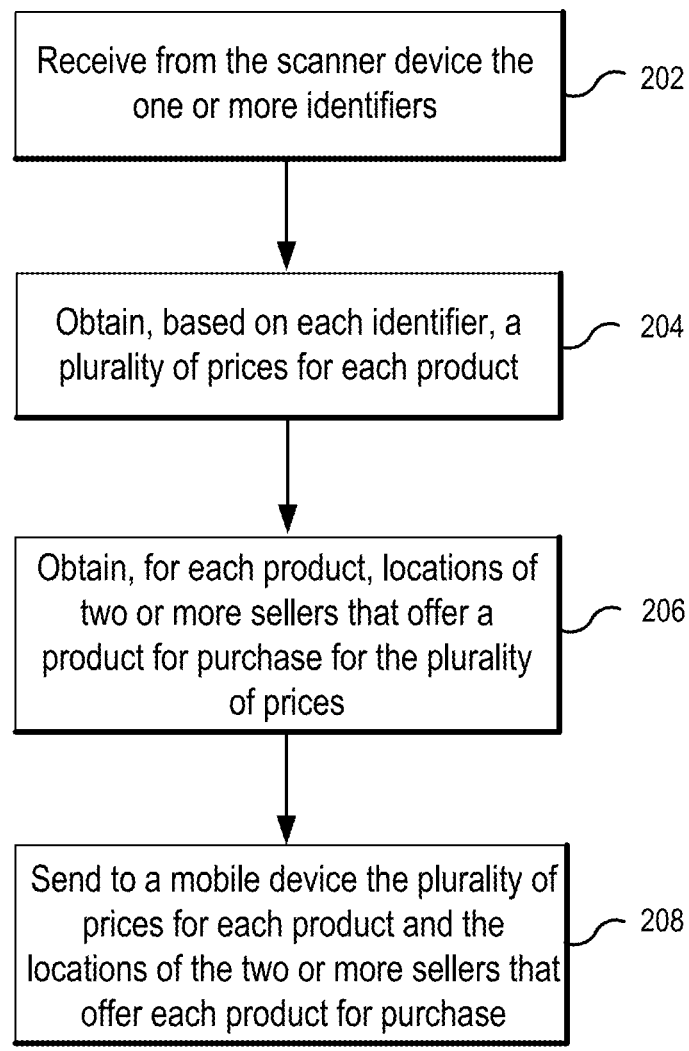
FIG. 2 shows an example flowchart performed by a remote server to obtain information about one or more products scanned by the scanner device.
Figure 3:
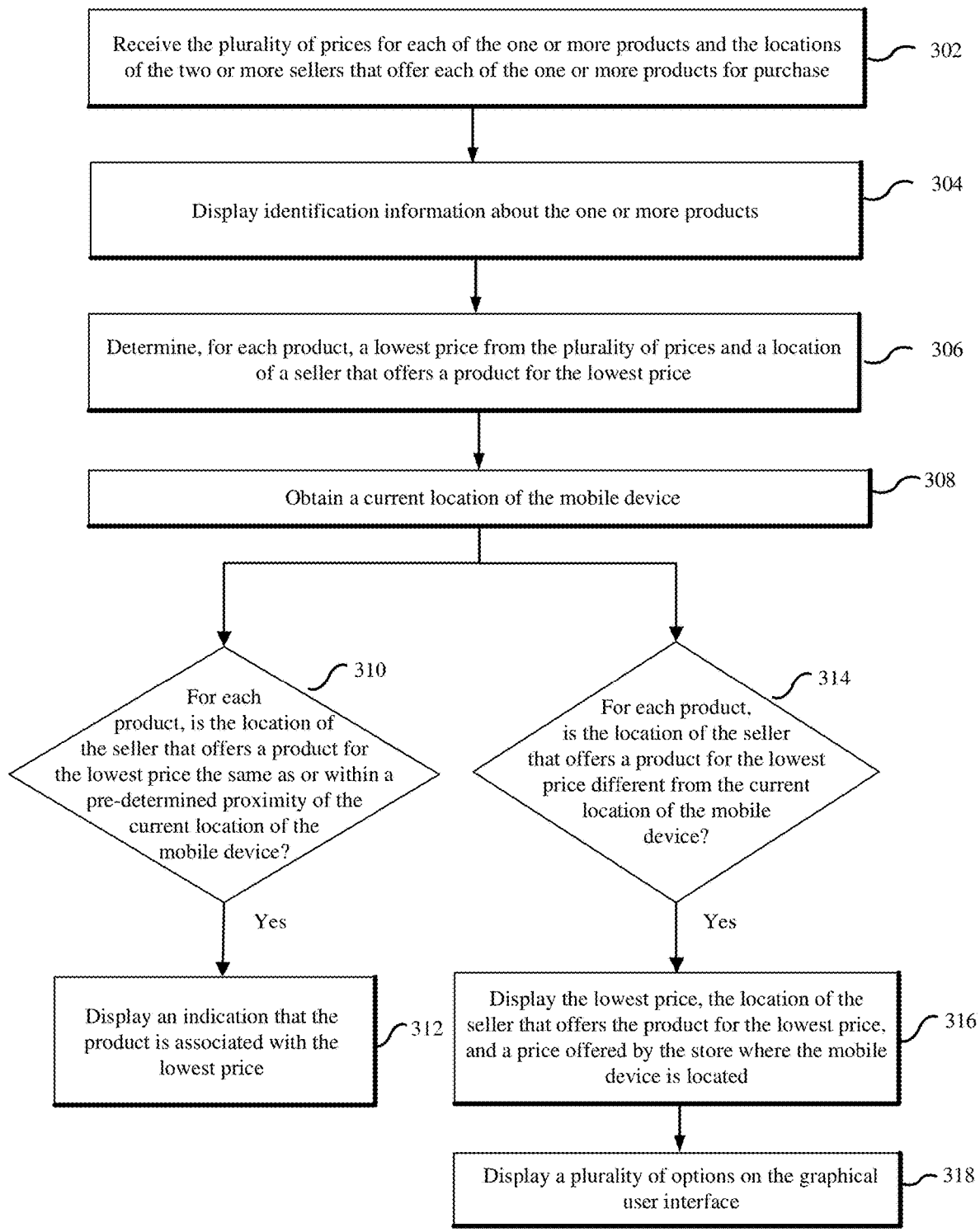
FIG. 3 shows an example flowchart to perform price comparison using a mobile device located within a physical retail store.

After the scanner device 104 obtains the one or more identifiers, the scanner device 104 sends these identifiers to a remote server (not shown in FIG. 1A) for data processing. As further explained in this disclosure, the remote server can obtain multiple store location information and multiple pricing information for each product based on the one or more identifiers. The multiple prices and store location information is sent by the remote server to the mobile device 106. As further explained in this patent document, the mobile device 106 provides price comparison information to the person for each product based on further analysis performed on the information provided to the mobile device 106. FIGS. 2 and 3 further describe the operations associated with the remote server and the mobile device 106, respectively.

FIG. 2 shows an example flowchart performed by a remote server to obtain information about one or more products scanned by the scanner device. At the receiving operation 202, the remote server receives from the scanner device the one or more identifiers where each identifier is associated with a product scanned by the scanner device.

At the obtaining operation 204, the remote server obtains, based on each identifier, a plurality of prices for each product. The remote server can be managed by a third-party that can periodically obtain pricing information for various products offered by physical retail stores and online sellers. In addition to pricing information, the remote server may also obtain the corresponding identifier used by the physical retail store or online seller for a product. By obtaining both the pricing and identifier information for various products, the remote server can easily identify a product based on an identifier received from the scanner device. By identifying the product, the remote server can identify same or similar products offered by other retail stores or other online sellers.

At the obtaining operation 206, the remote server can obtain, for each product, locations of two or more sellers that offer a product for purchase for the plurality of prices. For example, if a product includes a box of cereal, the location of two or more sellers that offer for purchase the same box of cereal may include the name and/or address of two physical retail stores (e.g., Ralphs or Safeway) and the name and/or website address of one online seller (e.g., Amazon or Jet).

At the obtaining operation 206, a location of one of the two or more sellers includes a location of the store where the scanner device or mobile device is located. For instance, if a person is shopping for a product at a Safeway retail store, the remote server obtains the pricing information for the product offered by that Safeway retail store so that, as explained below, the person's mobile device can compare the price for the product offered by the Safeway retail store where the person is located to other prices for the same or similar product offered by other retail stores or other online stores. In embodiments where the scanner device is included in or on the shopping cart, the remote server can obtain or determine the location of scanner device based on location information sent by the scanner device or based on a store identifier sent by the scanner device. The store identifier sent by the scanner device may be a pre-determined identifier associated with the store where the scanner device is located. In embodiments where the scanner device is included in a mobile device, the remote server can determine the location of mobile device (and therefore, the scanner device) based on location information sent by the mobile device.

At the sending operation 208, the remote server sends to a mobile device for further analysis the plurality of prices for each product and the locations of the two or more sellers that offer each product for purchase.

FIG. 3 shows an example flowchart to perform price comparison using a mobile device located within a physical retail store. At the receiving operation 302, the mobile device receives the plurality of prices for each of the one or more products and the locations of the two or more sellers that offer each of the one or more products for purchase.

At the displaying operation 304, the mobile device displays, on a graphical user interface of the mobile device, identification information about the one or more products. The identification can include name, stock keeper unit (SKU) number, or picture of the product. The identification information can be based at least in part on the one or more identifier. In embodiments where the scanner device sends the one or more identifiers to the remote server without using the mobile device (as described in FIG. 1A), the remote server may send to the mobile device the identification information. In embodiments where the scanner device sends the one or more identifiers to the remote server via the mobile device, the mobile device may display certain identification information based on the one or more identifiers (e.g., name of product or SKU number), and/or the mobile device may display certain identification information based on identification information received from the remote server (e.g., picture of the product or name of product).

At the determining operation 306, the mobile device determines, for each product, a lowest price from the plurality of prices and a location of a seller that offers a product for the lowest price. At the obtaining operation 308, the mobile device obtains a current location of the mobile device using, for example, location services in the mobile device.

At a determining operation 310, the mobile device determines for each product located in the shopping cart whether that the location of the seller that offers a product for the lowest price is the same as or within a pre-determined proximity (e.g., 0.2 mile) of the current location of the mobile device. For instance, for at least one product located in shopping cart, if the mobile device determines that the location of the seller that offers a product for the lowest price is the same as or within a pre-determined proximity of the current location of the mobile device, then the mobile device performs the displaying operation 312 where the mobile device displays an indication that the product is associated with the lowest price. The indication may be proximate to the lowest price. Some examples of the indication proximate to the identification information or proximate to the lowest price may include the words "lowest price" or an abbreviation "LP" or a green check mark.

Figure 4:
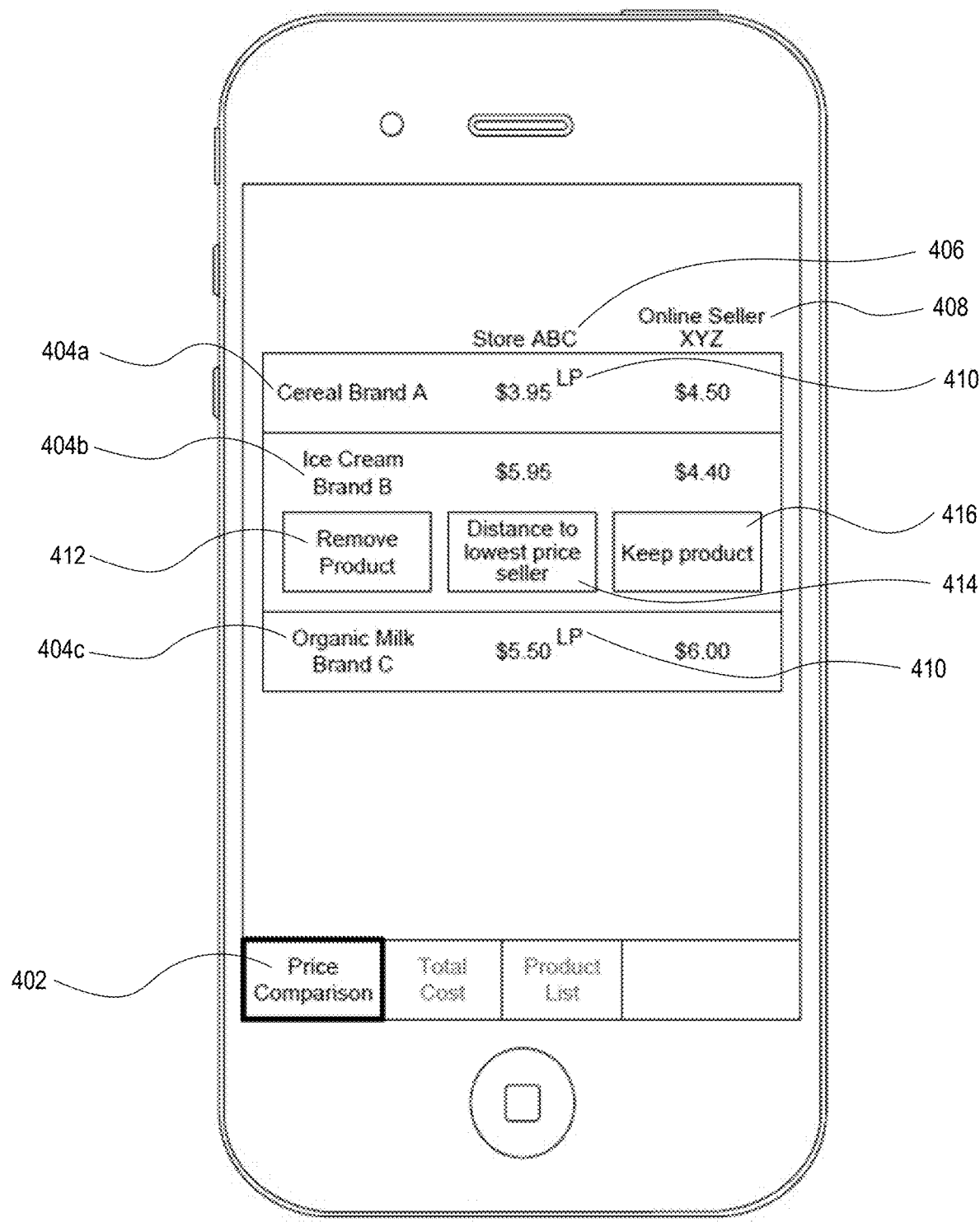
FIG. 4 shows an example graphical user interface (GUI) displayed on a mobile device for a price comparison feature.

FIG. 4 shows an example graphical user interface (GUI) displayed on a mobile device for a price comparison feature. The mobile device may display to a user a plurality of analysis options for the products placed in the user's shopping cart. As an example, on the bottom of the GUI, a mobile device application may display a user selectable option for a price comparison 402. Under this option, the mobile device application may display products placed in the shopping cart along with the prices associated with each product at the location where the user is shopping, and the prices associated with other online sellers or other retail stores. As shown in FIG. 4, the user has at least three products in his or her shopping cart: a Cereal Brand A, an Ice Cream Brand B, and an Organic Milk Brand C. The identification information 404a-404c (e.g., names) for these products are displayed by the mobile device application. The mobile device application displays in a first row 406 the prices for the various products associated with Store ABC where the user is currently shopping. In the second row 408 (and any additional subsequent rows), the mobile device application displays the prices for the same products (i.e., Cereal Brand A, Ice Cream Brand B, Organic Milk Brand C, etc.) offered for sale by another seller or retail store, such as an Online Seller XYZ. In some embodiments, additional sellers may be added to additional columns after the column for the Online Seller XYZ so that the user may scroll horizontally to view all the sellers identified by the remote server that offer the particular products that the user wants to purchase. One benefit of such a GUI on the mobile device is that it allows the user to use his or her mobile device to view and determine what stores offer the products that the user wants to purchase for the lowest price.

As described for the determining operation 310 in FIG. 3 and as further illustrated in FIG. 4, the mobile device displays one or more indications 410 next to the lowest price for the product, where the lowest price is being offered by the retail store (i.e., Store ABC) where the user is currently shopping. In some embodiments, if the lowest price is being offered by the retail store where the user is currently shopping, then the mobile device may not display the prices obtained for the same product from one or more other online sellers/retail stores. Thus, a mobile device can filter the data provided by the remote server to remove content (e.g., prices from other sellers for a product) that may not be necessary for display to the user (e.g., if the user is currently shopping at a location that offers the lowest price for the product).

Returning to FIG. 3, at the determining operation 314, the mobile device determines for each product whether the location of the seller that offers the product for the lowest price is different from the current location of the mobile device. For instance, for at least one product located in shopping cart, if the mobile device determines that the location of the seller that offers the product for the lowest price is different from the current location of the mobile device, then the mobile device performs the displaying operations 316 and 318.

At the displaying operation 316, the mobile device displays the lowest price, the location of the seller that offers the product for the lowest price, and a price offered by the store where the mobile device or scanner device is located. At the displaying operation 318, the mobile device displays a plurality of options on the graphical user interface. In some embodiments, the plurality of options includes a first option to remove the product from the shopping cart or return the product, a second option to determine a distance to the seller that offers the product for the lowest price, and a third option to keep the product in the shopping cart.

FIG. 4 illustrates the options presented to the user for a product if the retail store location where the user is currently shopping does not offer the lowest price for that product. The mobile device application displays options 412, 414, and 416 for a product associated with a price that is not the lowest price.

The first option 412 allows the user to indicate to the mobile device application that the user has removed the product from his or her shopping cart or to return the product. If the user requests the mobile device application to remove the product (i.e., Ice Cream Brand B) by clicking on the "remove product" button 412, then the mobile device application removes the identification information about the product from the graphical user interface.

The second option 414 allows the user to indicate to the mobile device application that the user wants to determine the distance from the current location of the mobile device to a physical retail store that offers the lowest price. By clicking on the "Distance to Seller with Lowest Price" button 414, the user requests the mobile device application to determine the distance from the current location of the mobile device to the seller that offers the product for the lowest price. If the lowest price is offered by an online seller then the second option 414 may be grayed out or the second option 414 may say "Show Product Online." By clicking on the "Show Product Online" option, the mobile device application may open a web browser with a web link of the online seller that offers the product for the lowest price (e.g., the "Online Seller XYZ" in FIG. 4).

The third option 416 allows the user to indicate to the mobile device application that the user wants to keep the product in his or her shopping cart despite it not having the lowest price at the retail store where the user is currently shopping. In some cases, such as option is helpful to user who prefer to purchase products based on convenience rather than lowest price. By presenting the three options 412, 414, and 416 to the user, the mobile device application can provide a user with a comprehensive and appropriate options that can allow the user to use his or her mobile device to more efficiently perform shopping related operations.

The determining operations 310 and 414 along with the corresponding displaying operations 312 and 316, 318 associated with the mobile device improve current technology because the mobile device can determine how to display relevant pricing information based on a comparison of whether the mobile device is located in the store offering the lowest price for a certain product.

II. Price Matching Policy Feature

In some embodiments, the mobile device displays information indicating to the user that the store where the user is currently shopping has a price matching policy. Such a feature is beneficial because it can allow the user to request a price match to obtain the lowest price and present the user to take any additional steps that may delay a purchase (e.g., drive to another store that has a product for the lowest price or purchase from an Internet seller the product for the lowest price).

The remote server can determine that the store where the scanner device or the mobile device is located has a price matching policy. For example, a scanner device or a mobile device may send information (e.g., location information or store identification information) that can enable the remote server to determine that the scanner device or the mobile device is located in a store that has a price matching policy. The remote server sends to the mobile device information that the store has the price matching policy. If the mobile device determines, for each product, that the location of the seller that offers a product for the lowest price is different from the current location of the mobile device, then the mobile device display a second indication that the store has the price matching policy. The second indication may be displayed proximate to the third option to keep the product in the shopping cart. Some examples of the second indication may include the words "price match" or the letters "PM." The price matching information can be arranged such that it is easy for the person to present the information to a sales associate if needed. In other embodiments, the mobile application is keeping a running tally of all the prices and essentially checking the person out as the person shops.

In some embodiments, the remote server can determine that the store where the scanner device or the mobile device is located does not have a price matching policy. The remote server may send this information to the mobile device that can display the lack of price matching offered by the store to the user. In such embodiments, the lack of price matching may be indicated by an indication (e.g., "no price match") proximate to the first option 412 that allows the user to indicate to the mobile device application that the user has removed the product from his or her shopping cart or to return the product.

III. Budgeting Feature

In some embodiments, the user may use his or her mobile device application to add one or more pre-determined values for a set of shopping categories. Based on a pre-determined value for a shopping category, a mobile device application can alert the user that a product that the user wants to purchase will exceed the user's budget, where the product is associated with the same shopping category as the pre-determined value. For example, the mobile device may display an indicator proximate to an identification information of a product if the mobile device determines that the lowest price associated with the product exceeds a pre-determined value for a category associated with the product. Some examples of an indicator may include the words "Exceed Budget" or the letters "EB" or a red exclamation mark.

In some embodiments, the user may use his or her mobile device application to add a pre-determined value to indicate an amount that the user wishes not to exceed to purchase one or more products at a given time. For example, if a user intends to not exceed $100 for his or her groceries per visit, the user can use the mobile device application to enter the value (i.e., 100) indicating a total spending limit. If the mobile device determines that a total cost for the one or more products offered for purchase by at least one seller exceeds the total spending limit, then the mobile device display another indication on the GUI. Some examples of another indicator may include the words "Total Budget Exceeded" or two flashing red exclamation marks.

IV. Total Cost Feature

In some embodiments, a user can look at a total cost for purchasing one or more products at one store versus another store (e.g., upload a shopping list and receive a total cost if all items were purchased at one store versus another store). As explained in this disclosure and shown in FIG. 4, the price comparison features allow a person to determine the lowest price for each product that the user wants to purchase. As shown in FIG. 4, the user is shopping at a physical retail store (i.e., Store ABC) that offers the lowest price for some of the products that the user wants to purchase (i.e., Cereal Brand A and Organic Milk Brand C). However, in some cases, the user may want to compare the total cost of purchasing all the products at one store versus at another store because the user may care about the convenience of purchasing the products at one store without having to drive to another store or without having to wait for the product to be delivered by an online seller. In some cases, the user may want to compare the total cost between the stores because the user may be a member of a rewards plan at one store but not another. The total cost feature described in FIG. 5 presents the user with information to make a decision to purchase some or all of the products at one store.

Figure 5:
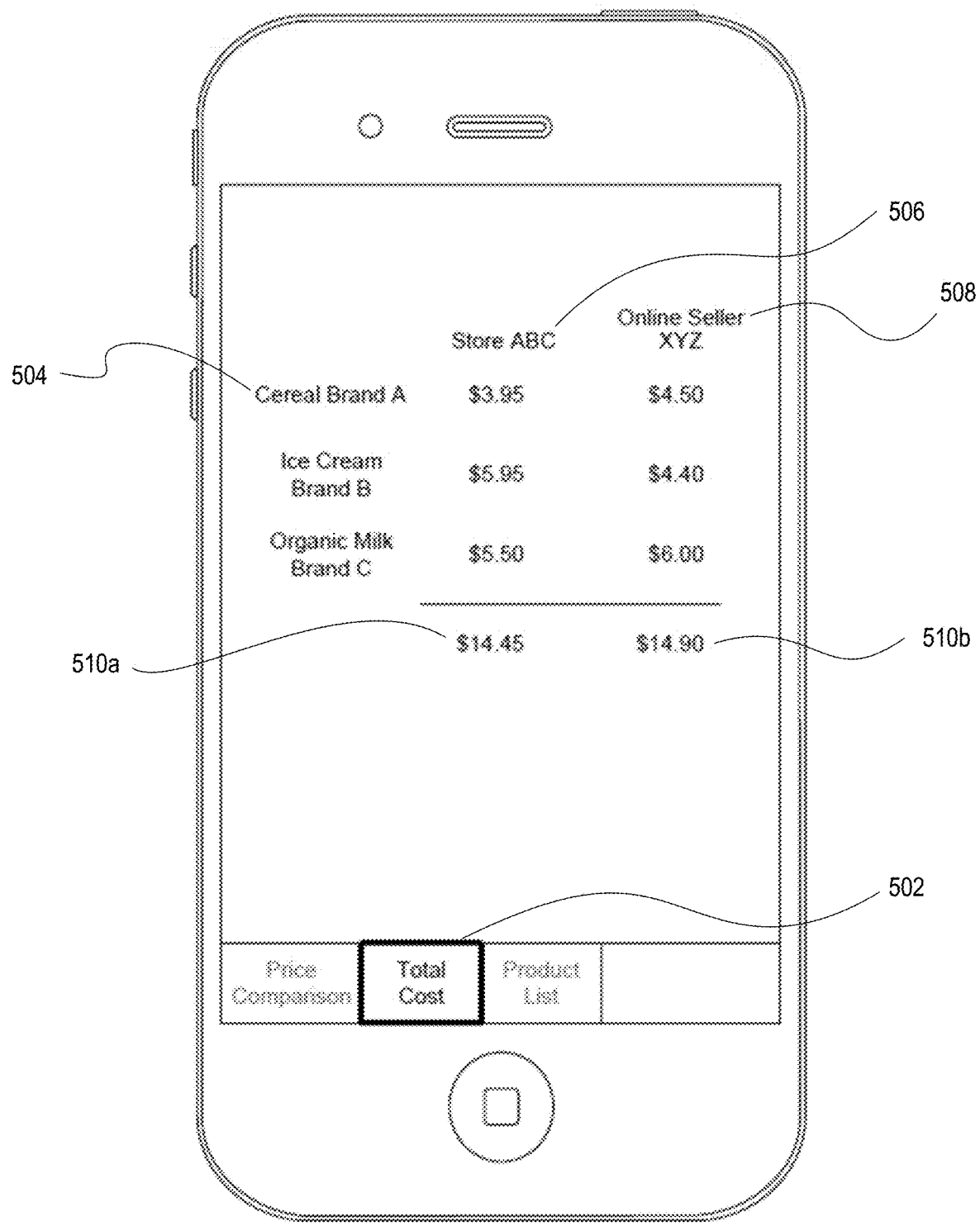
FIG. 5 shows an example GUI displayed on a mobile device for the total cost feature.

FIG. 5 shows an example GUI displayed on a mobile device for the total cost feature. The mobile device application can be configured to determine, for each seller, a total cost associated with the one or more products offered for purchase by each seller. As shown in FIG. 5, a mobile device application may have an option on the bottom called "Total Cost" 502 for the user to determine the price for the products in the user's shopping cart at various stores. Continuing with the example shown in FIG. 4, when the user clicks on the total cost button 502, the mobile device application displays a table that includes the identification information (e.g., name(s)) of the one or more products in a first row 504 and rows 506, 508 associated with two or more sellers.

Each of the rows 506, 508 is associated with a different seller so that each row 506, 508 includes one or more prices for the one or more products offered for purchase by each seller. As shown in FIG. 5, row 506 shows the prices offered by Store ABC for the products listed in the first row 504, and row 508 shows the prices offered by Online Store XYZ for the products listed in the first row 504. Each of the rows 506, 508 includes a total cost 510a, 510b determined by the mobile device and associated with the one or more products offered for purchase by each seller.

In some embodiments, if the physical retail store where the user is currently shopping price matches, the mobile device may obtain this information as described in this patent document. The total cost related computations performed by the mobile device may factor in that the physical retail store has a price matching policy. For example, in FIG. 4, for the Ice Cream Brand B, the mobile device may display $4.40 for Store ABC instead of $5.95 based on the information obtained by the mobile device that Store ABC has a price matching policy to other physical retail stores or online sellers. Thus, a mobile device may perform its computational operations by selectively performing price matching on each product that can be price matched. In this way, the mobile device can more accurately display to the user the options available to the user to maximize the cost savings available to the user.

In some embodiments, additional sellers may be added to additional columns after the column for the Online Seller XYZ so that the user may scroll horizontally to view the total cost associated all the sellers that offer the particular products that the user wants to purchase.

V. Price Comparison Feature—Prior to Shopping at a Physical Retail Store

In some embodiments, a user may be able to determine the lowest price(s) for a product(s) that the user wants to purchase before entering a physical retail store or performing an online search at an online seller's website. Using the techniques described below, a user may enter a product list comprising one or more products in a mobile device so that the mobile device may present on a GUI information about the stores offering the one or more products for the lowest price.

Figure 6:
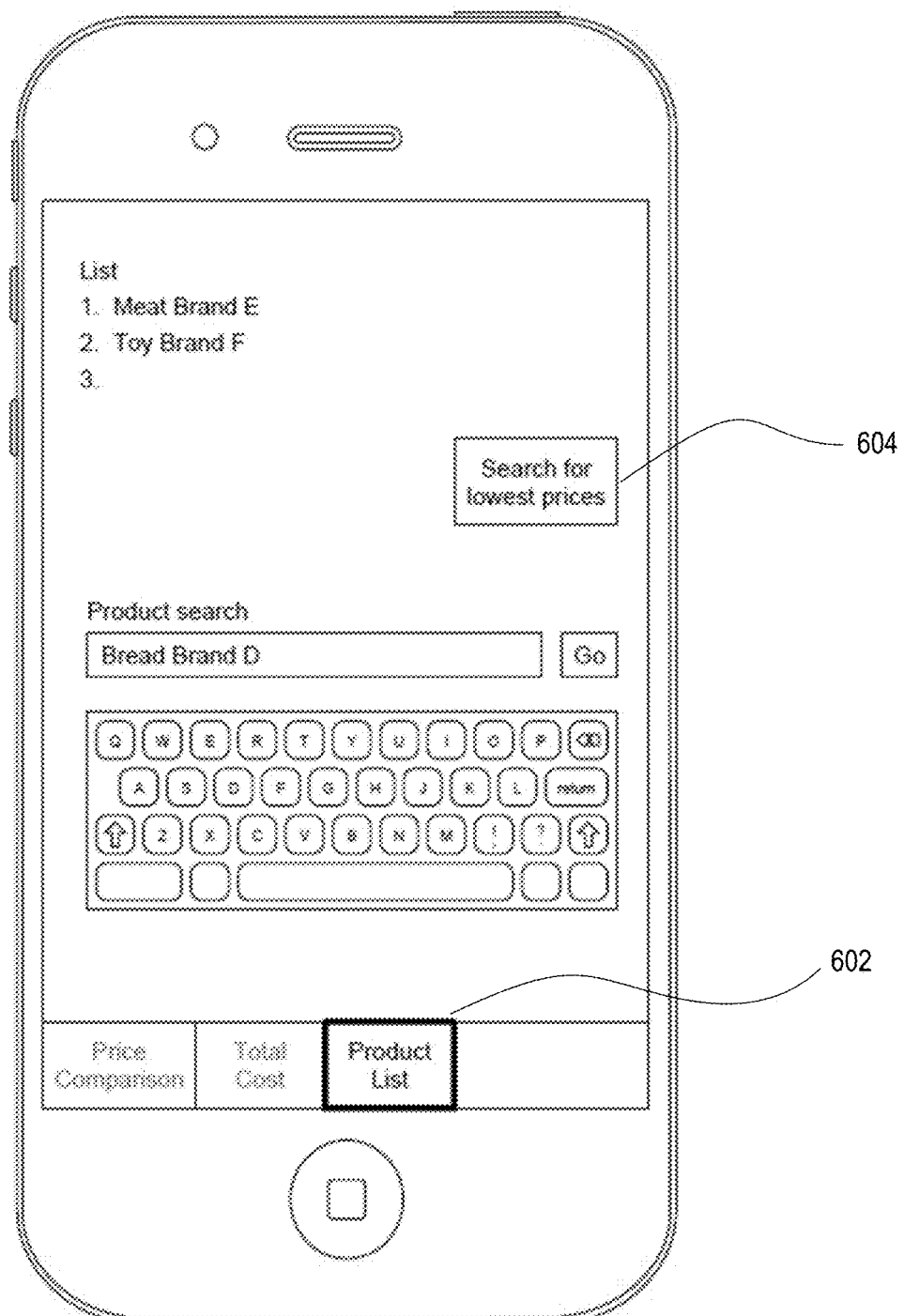
FIG. 6 shows an example GUI displayed on a mobile device for the product list feature.

FIG. 6 shows an example GUI displayed on a mobile device for the product list feature. On the bottom of the GUI, the user can select a "Product List" button 602 that allows the user to enter one or more products that the user wants to purchase. The user may the operations described for FIG. 6 before entering a physical retail store or performing an online search at an online seller's website. For instance, the user may have entered certain products that the user wants to purchase such as Meat Brand E and Toy Brand F, and is searching for Bread Brand D. Once the list is added, the user can select the "search for lowest prices" button 604 so that the mobile device, in communication with a remote server and as described in this patent document, can display the lowest prices for the products that the user wants to purchase.

Figure 7:
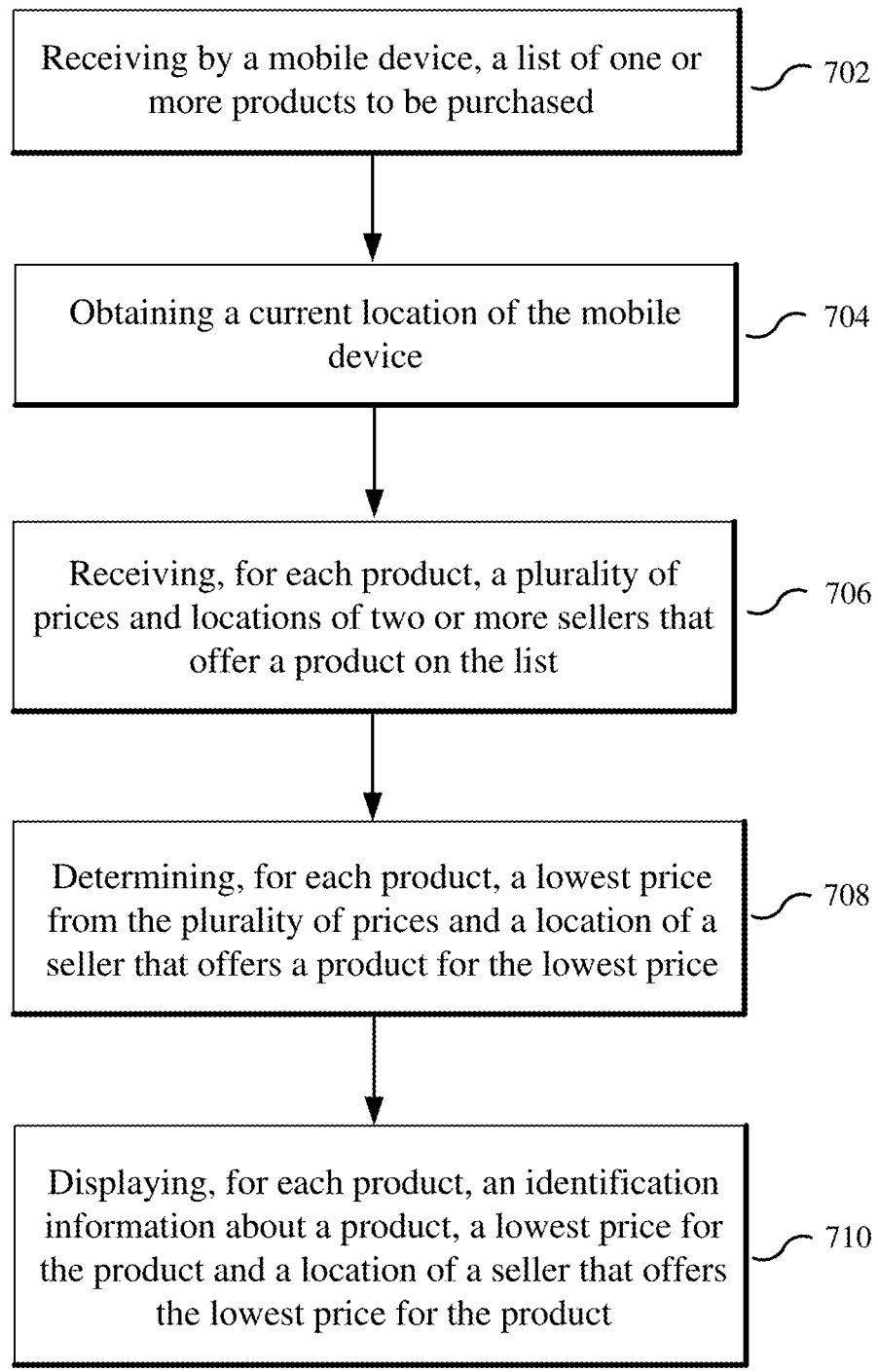
FIG. 7 shows an example flowchart to perform price comparison using a mobile device before entering a physical retail store or performing an online search at an online seller's website.

FIG. 7 shows an example flowchart to perform price comparison using a mobile device before entering a physical retail store or performing an online search at an online seller's website. At the receiving operation 702, the mobile device receives from a user a list of one or more products to be purchased and obtain a current location of the mobile device. At the obtaining operation 704, the mobile device obtains a current location of the mobile device. The mobile device sends to a remote server the list of the one or more products and the current location of the mobile device. The remote server can receive from the mobile device the list of the one or more products. Based on the received list of products, the remote server obtains, for each product, a plurality of prices and locations of two or more sellers that offer a product on the list for purchase. In some embodiments, the location of at least some of the two or more sellers may be within a pre-determined distance from the current location of the mobile device. For example, if a user is searching for the lowest prices for a product from the convenience of his or her home, the remote server may search for prices associated with physical retail store that may be within a certain pre-determined distance (e.g., 5 miles) from the user's mobile device's current location. In some embodiments, the user may select the pre-determined distance to indicate how far the user is willing to travel. The remote server sends to the mobile device the plurality of prices and the locations of the two or more sellers for each product.

At the receiving operation 706, the mobile device receives, for each product, the plurality of prices and the locations of the two or more sellers that offer a product on the list. At the determining operation 708, the mobile device determines, for each product, a lowest price from the plurality of prices and a location of a seller that offers a product for the lowest price.

At the displaying operation 710, the mobile device displays, for each product, an identification information about a product, a lowest price for the product and a location of a seller that offers the lowest price for the product. This display operation may produce a GUI similar to the one shown in FIG. 4. On top of the name of the sellers, the mobile device may add a location of the seller (e.g., a physical address of a physical retail store or a web address of an online seller).

As described in this patent document for the budgeting feature, in some embodiments, the mobile device may display, for each product, a first indication proximate to an identification information of a product if the mobile device determines that the lowest price for the product exceeds a first pre-determined value for a category associated with the product. In some embodiments, the mobile device may display a second indication if the mobile device determines that a total cost for the one or more products offered for purchase by at least one seller exceeds a second pre-determined value for total spending by the user.

As described in this disclosure, for the total cost feature, in some embodiments, the mobile device may determine, for each seller, a total cost associated with the one or more products offered for purchase by each seller. Next, the mobile device can display a table that includes identification information of the one or more products in a first row and a plurality of rows associated with the two or more sellers. Each of the rows includes one or more prices for the one or more products offered for purchase by each seller, and each of the rows includes the total cost associated with the one or more products offered for purchase by each seller.

VI. Historical Prices

In some embodiments, a remote server may provide to a mobile device a graph of historical prices associated with each product that the user wants to purchase. In one implementation example, in FIGS. 4 and/or 5, the user may be able to select or click on the identification information of the various products (e.g., Cereal Brand A or Organic Milk Brand C) so that the mobile device can display a graph of the historical prices associated with one or more products. The historical prices graph data may be provided by the remote server over a certain time period (e.g., six months or one year). In one example implementation, the user may be able to select the data on the graph so that the mobile device can show the price offered for that product by a store at a certain time (e.g., in the previous month or eight months ago). This feature may be beneficial to the user so that based on the information presented by the mobile device, the user can determine the best time to purchase a product.

Figure 8:
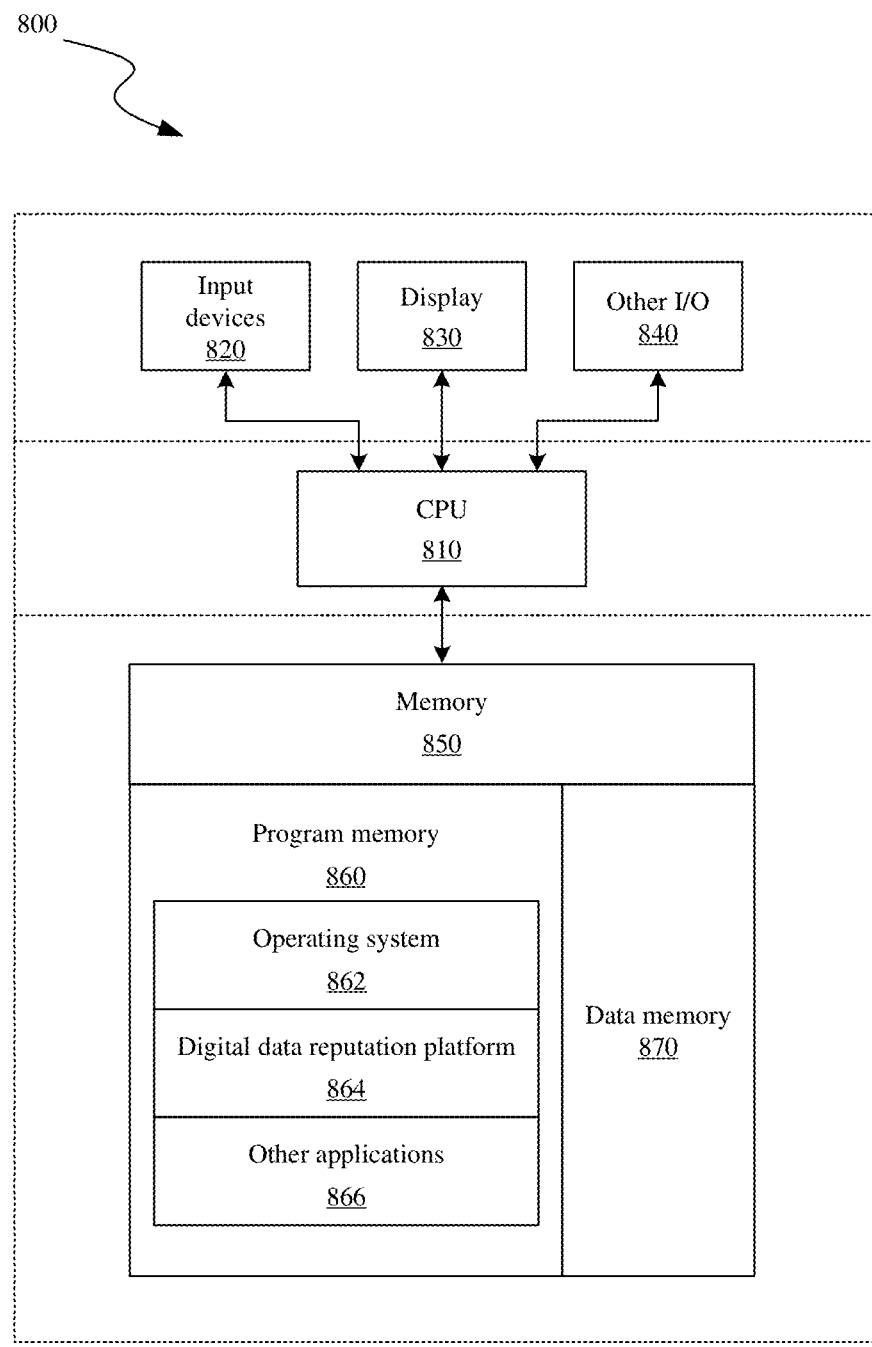
FIG. 8 is a block diagram illustrating an overview of devices on which some implementations of the disclosed technology can operate.

FIG. 8 is a block diagram illustrating an overview of devices on which some implementations of the disclosed technology can operate. The devices can comprise hardware components of a device 800, such as a mobile device, that manages the price comparison platform 864a, total cost platform 864b, and product list platform 864c that may include information associated with and operations performed to provide price comparison and/or total cost. Device 800 can include one or more input devices 820 that provide input to the CPU (processor) 810, notifying it of actions. The actions are typically mediated by a hardware controller that interprets the signals received from the input device and communicates the information to the CPU 810 using a communication protocol. Input devices 820 include, for example, a mouse, a keyboard, a touchscreen, an infrared sensor, a touchpad, a wearable input device, a camera- or image-based input device, a microphone, or other user input devices.

CPU 810 can be a single processing unit or multiple processing units in a device or distributed across multiple devices. CPU 810 can be coupled to other hardware devices, for example, with the use of a bus, such as a PCI bus or SCSI bus. The CPU 810 can communicate with a hardware controller for devices, such as for a display 830. Display 830 can be used to display text and graphics. In some examples, display 830 provides graphical and textual visual feedback to a user (e.g., as shown in FIGS. 4-6). In some implementations, display 830 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 840 can also be coupled to the processor, such as a network card, video card, audio card, USB, FireWire or other external device, camera, printer, speakers, CD-ROM drive, DVD drive, disk drive, or Blu-Ray device.

In some implementations, the device 800 also includes a communication device capable of communicating wirelessly or wire-based with a network node. The communication device can communicate with another device or a server through a network using, for example, TCP/IP protocols. Device 800 can utilize the communication device to distribute operations across multiple network devices.

The CPU 810 can have access to a memory 850. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 850 can include program memory 860 that stores programs and software, such as an operating system 862, the price comparison platform 864a, total cost platform 864b, and product list platform 864c, and other application programs 866 (e.g., the budgeting program or historical prices program). Thus, for example, the memory 850 may store instructions that upon execution by CPU 810 configure the device 800 to perform the operations described in FIG. 3 and/or in the various embodiments described in this patent document. Memory 850 can also include data memory 870 that can include multiple pricing information for products that the user wants to purchase, location information of multiple stores that offer for purchase the products that the user wants to purchase, values for the budgeting, the price matching information for the store where the user is shopping, values for total cost determinations, etc., which can be provided to the program memory 860 or any element of the device 800.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 9:
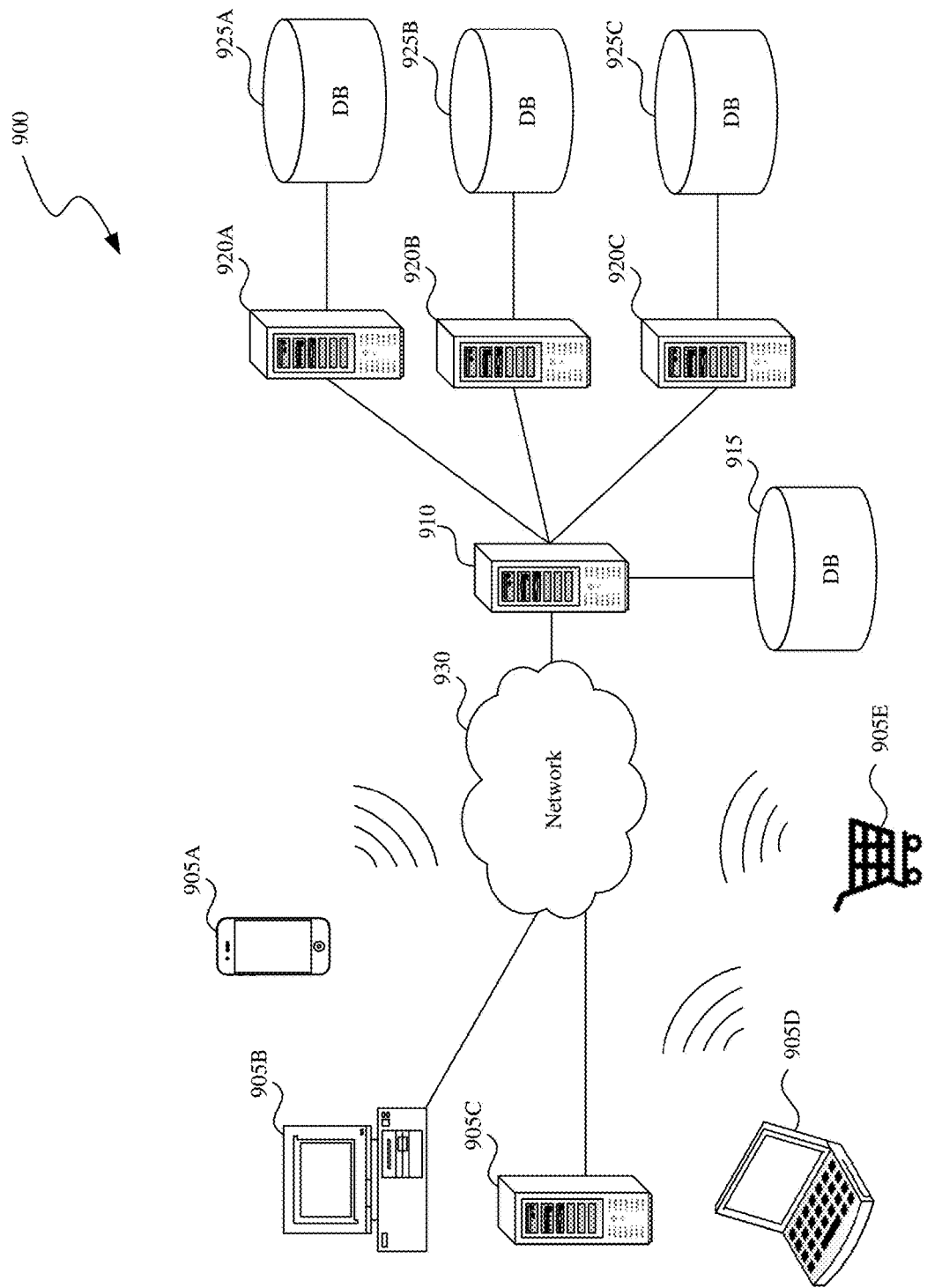
FIG. 9 is a block diagram illustrating an overview of an environment in which some implementations of the disclosed technology can operate.

FIG. 9 is a block diagram illustrating an overview of an environment 900 in which some implementations of the disclosed technology can operate. Environment 900 can include one or more client computing devices 905A-E, examples of which can include device 800. Client computing devices 905A-E can operate in a networked environment using logical connections through network 930 to one or more remote computers, such as a server computing device 910. As shown in FIG. 9, examples of client computing devices 905A-E may include a portable electronic device 905A, a computer 905B, a server 905C, a laptop 905D or a shopping cart with a scanner device 505E.

In some implementations, server computing device 910 can be an edge server that receives client requests and coordinates fulfillment of those requests through other servers, such as servers 920A-C. the remote server mentioned in this patent document may include the server computing device 910 and/or one or more server computing devices 920A-C. Though each server computing device 910 and 920A-C is displayed logically as a single server, server computing devices can each be a distributed computing environment encompassing multiple computing devices located at the same or at geographically disparate physical locations. In some implementations, each server computing device 920 corresponds to a group of servers.

Client computing devices 905A-E and server computing devices 910 and 920A-C can each act as a server or client to other server/client devices. Server 910 can connect to a database 915. Servers 920A-C can each connect to a corresponding database 925A-C. As discussed above, each server 920 can correspond to a group of servers, and each of these servers can share a database or can have their own database. Databases 915 and 925 can warehouse (e.g., store) information such as prices offered by various sellers (e.g., physical retail stores or online sellers) for various products, identifiers used by the various stores to identify the products, identification information of the various products (e.g., names, SKU number, or pictures), locations of the various sellers, price matching policy associated with the various sellers, or historical pricing associated with various products. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but can also be other wired or wireless networks. Network 930 may be the Internet or some other public or private network. Client computing devices 905A-E can be connected to network 930 through a network interface, such as by wired or wireless communication. While the connections between server 910 and servers 920A-C are shown as separate connections, these connections can be any kind of local, wide area, wired, or wireless network, including network 930 or a separate public or private network.

Figure 10:
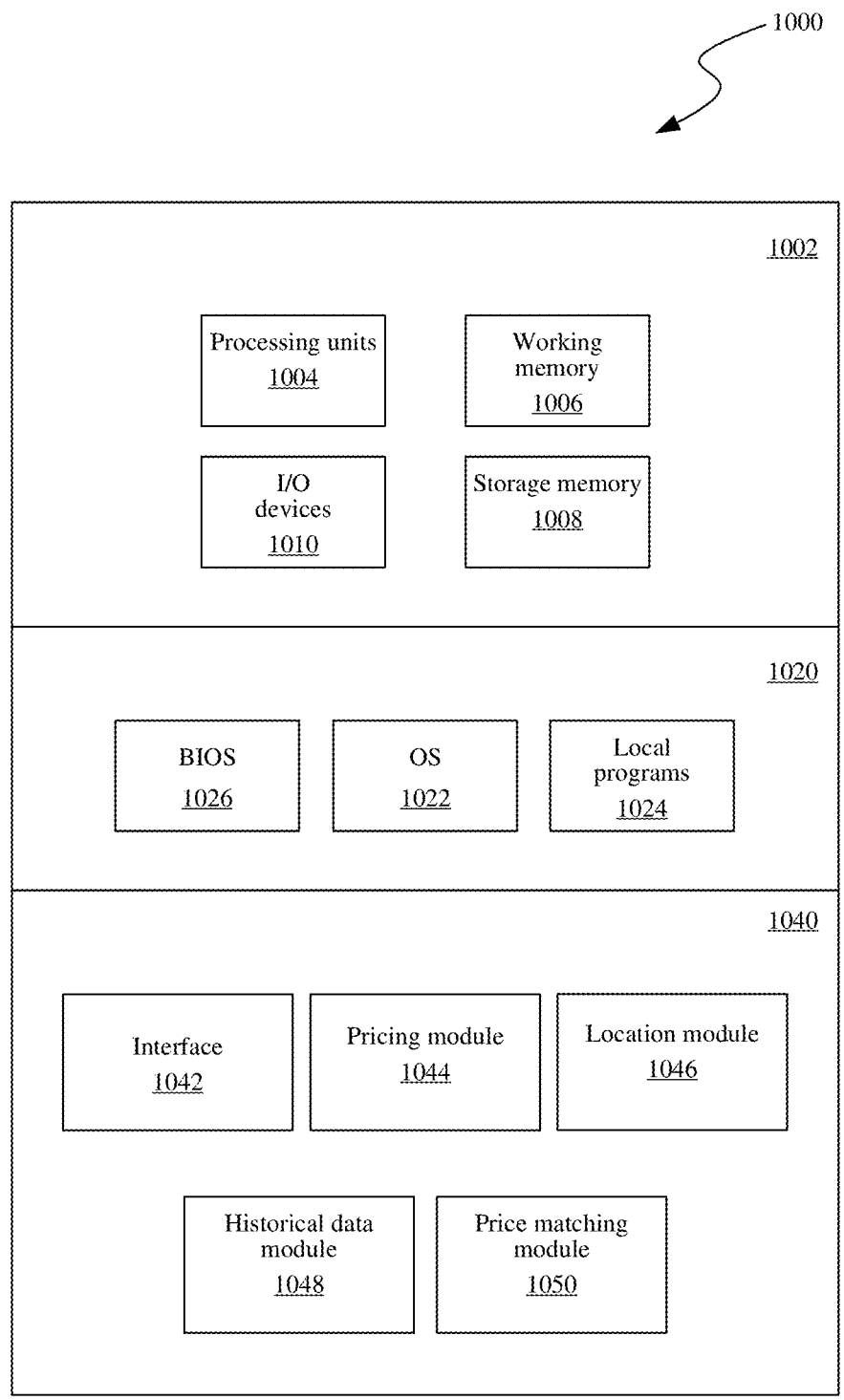
FIG. 10 is a block diagram illustrating components which, in some implementations, can be used in a system employing the disclosed technology.

FIG. 10 is a block diagram illustrating components 1000 which, in some implementations, can be used in a system employing the disclosed technology. The components 1000 include hardware 1002, general software 1020, and specialized components 1040. As discussed above, a system implementing the disclosed technology can use various hardware, including processing units 1004 (e.g., CPUs, GPUs, APUs, etc.), working memory 1006, storage memory 1008, and input and output devices 1010. Some or all of the components 1000 can be implemented on a server computing device, such as server computing device 910 or 920A-C. For example, a memory may store instructions that upon execution by the processing units 1004 configure the remote server to perform the operations described in FIG. 2 and/or in the various embodiments described in this patent document.

General software 1020 can include various applications, including an operating system 1022, local programs 1024, and a basic input output system (BIOS) 1026. Specialized components 1040 can be subcomponents of a general software application 1020, such as local programs 1024. Specialized components 1040 can include any one or more of pricing module 1044, location module 1046, historical data module 1048, price matching module 1050, and components that can be used for transferring data and controlling the specialized components, such as interface 1042. In some implementations, components 1000 can be in a computing system that is distributed across multiple computing devices or can be an interface to a server-based application executing one or more of specialized components 1040.

The pricing module 1044 may determine the plurality of prices for each product based on the one or more identifiers received for the one or more products that the user wants to purchase. The location module 1046 may determine locations of two or more sellers that offer each product for purchase. The location of one of the sellers includes a location of the store where the scanner device or mobile device is located. The historical data module 1048 may provide to a mobile device a graph of the historical prices with one or more products that the user wants to purchase. The price matching module 1050 determines that the store where the scanner device or the mobile device is located has a price matching policy and sends this information to the mobile device.

Those skilled in the art will appreciate that the components illustrated in FIG. 8-10 described above, and in each of the flow diagrams, may be altered in a variety of ways. For example, the order of the logic may be rearranged, substeps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system to analyze products located in a retail store, the system comprising:
   a scanner device located within a store, the scanner device configured to:
      scan one or more products placed in a shopping cart;
      obtain, based on the scan, an identifier associated with each product; and
      send one or more identifiers for the one or more products to a remote server;
   the remote server configured to:
      receive from the scanner device the one or more identifiers;
      obtain, based on each identifier, a plurality of prices for each product;
      obtain, for each product, locations of two or more sellers that offer a product for purchase for the plurality of prices, wherein a location of one of the sellers includes a location of the store where the scanner device is located;
      send to a mobile device the plurality of prices for each product and the locations of the two or more sellers that offer each product for purchase;
   the mobile device located within the store, the mobile device configured to:
      receive the plurality of prices for each of the one or more products and the locations of the two or more sellers that offer each of the one or more products for purchase;
      display, on a graphical user interface of the mobile device, identification information about the one or more products, wherein the identification information is based at least in part on the one or more identifier;
      determine, for each product, a lowest price from the plurality of prices and a location of a seller that offers a product for the lowest price;
      obtain a current location of the mobile device;
      in response to determining, for each product located in the shopping cart, that the location of the seller that offers a product for the lowest price is the same as or within a pre-determined proximity of the current location of the mobile device:
         display an indication that the product is associated with the lowest price, wherein the indication is proximate to the lowest price; and
      in response to determining, for each product located in the shopping cart, that the location of the seller that offers the product for the lowest price is different from the current location of the mobile device:

display the lowest price, the location of the seller that offers a product for the lowest price, and a price offered by the store where the mobile device is located; and display a plurality of options on the graphical user interface, wherein the plurality of options includes:
a first option to remove the product from the shopping cart or return the product,
a second option to determine a distance to the seller that offers the product for the lowest price, and
a third option to keep the product in the shopping cart.

2. The system of claim 1, wherein the mobile device is configured to remove the identification information about the product from the graphical user interface in response to receiving a request to remove the product from the shopping cart or to return the product.

3. The system of claim 1, wherein the mobile device is configured to determine the distance from the current location of the mobile device to the seller that offers the product for the lowest price in response to receiving a request to determine the distance to the seller that offers the product for the lowest price.

4. The system of claim 1, further comprising:
the remote server configured to:
determine that the store where the scanner device or the mobile device is located has a price matching policy;
send, to the mobile device, information that the store has the price matching policy;
the mobile device configured to:
in response to determining, for each product located in the shopping cart, that the location of the seller that offers the product for the lowest price is different from the current location of the mobile device:
display a second indication that the store has the price matching policy, wherein the second indication is displayed proximate to the third option to keep the product in the shopping cart.

5. The system of claim 1, wherein
the mobile device is configured to:
display, for each product, a third indication proximate to the identification information of a product in response to determining that the lowest price for the product exceeds a first pre-determined value for a category associated with the product.

6. The system of claim 1, wherein
the mobile device is configured to:
display a fourth indication in response to determining that a total cost for the one or more products offered for purchase by at least one seller exceeds a second pre-determined value for total spending by a user.

7. The system of claim 1, further comprising:
the mobile device configured to:
determine, for each seller, a total cost associated with the one or more products offered for purchase by each seller;
display on the mobile device a table that includes the identification information of the one or more products in a first row and a plurality of rows associated with the two or more sellers,
wherein each of the plurality of rows includes one or more prices for the one or more products offered for purchase by each seller, and
wherein each of the plurality of rows includes the total cost associated with the one or more products offered for purchase by each seller.

8. The system of claim 1, wherein the scanner device includes an optical reader, a radio frequency identification (RFID) reader, a near-field communication (NFC) device, or a camera.

9. The system of claim 1, wherein the scanner device sends the one or more identifiers to the remote server via the mobile device.

10. The system of claim 1, wherein the scanner device is included in the mobile device or in the shopping cart.

11. The system of claim 1, wherein the scanner device is configured to:
determine a weight of at least one product, wherein the plurality of prices for the at least one product is based on the weight of the at least one product.

12. A method for analyzing products located in a retail store, the method comprising:
receiving, by a mobile device, a plurality of prices for each of one or more products and locations of two or more sellers that offer each of the one or more products for purchase, wherein the one or more products are located in a shopping cart and to be purchased by a user of the mobile device;
displaying, by the mobile device, on a graphical user interface of the mobile device, identification information about the one or more products, wherein the identification information is based at least in part on the one or more identifier associated with the one or more products;
determining, by the mobile device, for each product, a lowest price from the plurality of prices and a location of a seller that offers a product for the lowest price;
obtaining, by the mobile device, a current location of the mobile device;
in response to determining, for each product located in the shopping cart, that the location of the seller that offers a product for the lowest price is the same as or within a pre-determined proximity of the current location of the mobile device:
displaying an indication that the product is associated with the lowest price, wherein the indication is proximate to the lowest price; and
in response to determining, for each product located in the shopping cart, that the location of the seller that offers the product for the lowest price is different from the current location of the mobile device:
displaying the lowest price, the location of the seller that offers a product for the lowest price, and a price offered by the store where the mobile device is located;
displaying a plurality of options on the graphical user interface, wherein the plurality of options includes:
a first option to remove the product from the shopping cart or return the product, wherein the mobile device is configured to remove the identification information about the product from the graphical user interface in response to receiving a request to remove the product from the shopping cart or to return the product,
a second option to determine a distance to the seller that offers the product for the lowest price, and
a third option to keep the product in the shopping cart.

13. The method of claim 12, wherein the mobile device is configured to determine the distance from the current location of the mobile device to the seller that offers the product for the lowest price in response to receiving a request to determine the distance to the seller that offers the product for the lowest price.

14. The method of claim 12, wherein in response to determining, for each product located in the shopping cart, that the location of the seller that offers the product for the lowest price is different from the current location of the mobile device, the method further comprises:

displaying a second indication that the store has a price matching policy, wherein the second indication is displayed proximate to the third option to keep the product in the shopping cart.

15. The method of claim 12, further comprising displaying, for each product, a third indication proximate to the identification information of a product in response to determining that the lowest price for the product exceeds a first pre-determined value for a category associated with the product.

16. The method of claim 12, further comprising displaying a fourth indication in response to determining that a total cost for the one or more products offered for purchase by at least one seller exceeds a second pre-determined value for total spending by the user.

17. The method of claim 12, further comprising:

determining, for each seller, a total cost associated with the one or more products offered for purchase by each seller;

displaying on the mobile device a table that includes the identification information of the one or more products in a first row and a plurality of rows associated with the two or more sellers, wherein each of the plurality of rows includes one or more prices for the one or more products offered for purchase by each seller, and wherein each of the plurality of rows includes the total cost associated with the one or more products offered for purchase by each seller.

18. A non-transitory computer-readable medium storing instructions that, when executed by a computing system, cause the computing system to perform operations to analyze products located in a retail store, the operations comprising:

receiving, by a mobile device, a plurality of prices for each of one or more products and locations of two or more sellers that offer each of the one or more products for purchase, wherein the one or more products are located in a shopping cart and to be purchased by a user of the mobile device;

displaying, by the mobile device, on a graphical user interface of the mobile device, identification information about the one or more products, wherein the identification information is based at least in part on the one or more identifier associated with the one or more products;

determining, by the mobile device, for each product, a lowest price from the plurality of prices and a location of a seller that offers a product for the lowest price;

obtaining, by the mobile device, a current location of the mobile device;

in response to determining, for each product located in the shopping cart, that the location of the seller that offers a product for the lowest price is the same as or within a pre-determined proximity of the current location of the mobile device:

displaying an indication that the product is associated with the lowest price, wherein the indication is proximate to the lowest price; and in response to determining, for each product located in the shopping cart, that the location of the seller that offers the product for the lowest price is different from the current location of the mobile device:

displaying the lowest price, the location of the seller that offers a product for the lowest price, and a price offered by the store where the mobile device is located;

displaying a plurality of options on the graphical user interface, wherein the plurality of options includes:

a first option to remove the product from the shopping cart or return the product, wherein the mobile device is configured to remove the identification information about the product from the graphical user interface in response to receiving a request to remove the product from the shopping cart or to return the product, a second option to determine a distance to the seller that offers the product for the lowest price, and a third option to keep the product in the shopping cart.

\* \* \* \* \*